US012658040B2

(12) United States Patent
Cubon

(10) Patent No.: US 12,658,040 B2
(45) Date of Patent: Jun. 16, 2026

(54) HEATING SYSTEM

(71) Applicant: Tramec, L.L.C., Shawnee, KS (US)

(72) Inventor: Michael M Cubon, Park Ridge, IL (US)

(73) Assignee: Tramec, L.L.C., Shawnee, KS (US)

( * ) Notice: Subject to any disclaimer, the term of this patent is extended or adjusted under 35 U.S.C. 154(b) by 41 days.

(21) Appl. No.: 18/949,418

(22) Filed: Nov. 15, 2024

(65) Prior Publication Data

US 2025/0069503 A1 Feb. 27, 2025

Related U.S. Application Data

(63) Continuation of application No. 18/358,750, filed on Jul. 25, 2023, now abandoned, which is a continuation of application No. 17/111,732, filed on Dec. 4, 2020, now abandoned.

(60) Provisional application No. 62/943,283, filed on Dec. 4, 2019.

(51) Int. Cl.

| | |
|---|---|
| ***G08G 1/095*** | (2006.01) |
| ***G08C 17/00*** | (2006.01) |
| ***H05B 1/02*** | (2006.01) |
| ***H05B 3/04*** | (2006.01) |

(52) U.S. Cl.

CPC ............. *G08G 1/095* (2013.01); *G08C 17/00* (2013.01); *H05B 1/0288* (2013.01); *H05B 3/04* (2013.01); *H05B 2203/02* (2013.01)

(58) Field of Classification Search

CPC ...... G08C 17/00; G08G 1/095; H05B 1/0288; H05B 2203/011; H05B 2203/02; H05B 3/04; H05B 3/06; H05B 3/34

See application file for complete search history.

(56) References Cited

U.S. PATENT DOCUMENTS

| | | | | |
|---|---|---|---|---|
| 2010/0032421 | A1* | 2/2010 | Martinez | H05B 3/84 219/520 |
| 2013/0210360 | A1* | 8/2013 | Ljung | H04W 12/02 455/41.2 |
| 2015/0055944 | A1* | 2/2015 | Van Straten | H05B 3/16 392/426 |
| 2016/0008165 | A1 | 1/2016 | Baelden | |
| 2016/0148507 | A1* | 5/2016 | Pittman | G06Q 30/0255 340/917 |
| 2017/0367153 | A1* | 12/2017 | Rooymans | H02J 3/381 |
| 2019/0344689 | A1* | 11/2019 | Bailey | B60N 2/58 |
| 2020/0027343 | A1* | 1/2020 | Rorrer | F21V 15/01 |

FOREIGN PATENT DOCUMENTS

| | | | |
|---|---|---|---|
| JP | 2003303399 A * | 10/2003 | E01F 9/40 |
| KR | 20180108304 A | 10/2018 | |

* cited by examiner

*Primary Examiner* — Omer S Khan

(74) *Attorney, Agent, or Firm* — McGarry Bair PC

(57) ABSTRACT

A traffic light with a housing, a light assembly mounted to the housing, a visor extending from the housing surrounding the light assembly. The traffic light further including a heater element having multiple layers.

36 Claims, 8 Drawing Sheets

HEATING SYSTEM

CROSS REFERENCE TO RELATED APPLICATION

This application is a continuation of U.S. patent application Ser. No. 18/358,750 filed Jul. 25, 2023, which is a continuation of U.S. patent application Ser. No. 17/111,732 filed Dec. 4, 2020, which claims the benefit of U.S. Provisional Application No. 62/943,283, filed Dec. 4, 2019, all of which are incorporated herein in their entirety.

TECHNICAL FIELD

The disclosure generally relates to a heating system, and more specifically to a heating system for a traffic light.

BACKGROUND

Snow and ice buildup on the lenses of a traffic light poses a safety hazard for drivers during winter storm conditions by blocking the lights. In the past there have been various methods used in an effort to mitigate or eliminate snow and ice buildup.

Additionally, the replacement of traditional incandescent bulbs with light emitting diodes (LEDs) is on the rise. Use of LEDs includes energy savings as high as 90%. Additionally, traditional incandescent bulbs, that were widely used prior to the introduction of LEDs, are rated for two years of traffic use. Changing the bulbs is challenging and costly. Additionally, LEDs are becoming brighter and more energy efficient every year.

The replacement of incandescent traffic lights with LEDs has reduced the amount of heat present at the lens face and in the visor volume of a traffic light. Consequently, a lower amount of heat increases the probability of snow and ice accumulation on the lens and in the visor volume for traffic light assemblies with LEDs relative to incandescent lights.

DETAILED DESCRIPTION

Figure 1A:
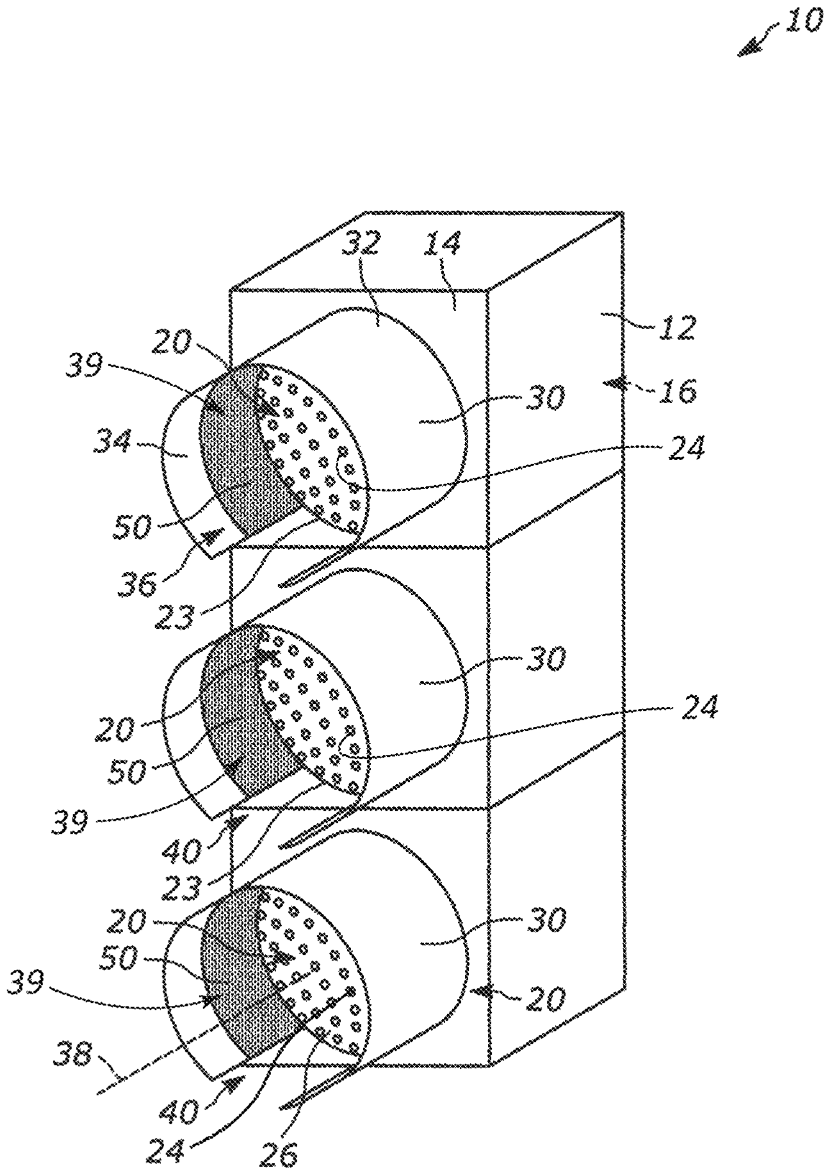
FIG. 1A is a schematic illustration of a light fixture including an example heating system.

Aspects of the disclosure described herein are directed to a traffic light with a heating system that is cost effective, easy to integrate, and will provide heat in and around a lens and visor of the traffic light. The heating system is efficient and provides significant energy savings over traditional technology. The heating system shown and described herein can be very effective at melting snow that has built up within the traffic light and can help prevent ice and snow from building up in the first place. In one example, the heating system includes a self-regulating heater element provided on the visor that at least partially surrounds the lens. A supplemental heater element can optionally be added around the perimeter of the traffic light.

The heating system includes a heater element formed as a fixed wattage heater or a positive temperature coefficient (PTC) heater element. In the latter case, the PTC heater element contains conductor particles, e.g., a conductive carbon black filler material, dispersed in a polymer base or matrix having a crystalline structure. The crystalline structure of the matrix densely packs the conductor particles into its boundary so they are close enough together at room temperature to form chains and allow conductive paths of current to flow through the polymer insulator via these carbon chains.

When the resistive layer is at room temperature, there are numerous carbon chains forming conductive paths through the matrix. In some embodiments, there are two conductive buses with each having a corresponding terminal connected to the resistive layer. When a voltage is applied across the resistive layer from the conductive buses, the layer carries a current via the conductive particles. As a result, the temperature of the resistive polymer layer rises until it exceeds the polymer's transition temperature, causing the polymer to change from its initial crystalline phase to an amorphous phase. In the amorphous phase, the conductor particles are spaced further apart from one another [relative to the crystalline phase] and, thus, the electrical resistance of the resistive polymer layer increases until current is prevented from passing through the resistive layer. This, in turn, prevents current from passing through the conductive buses to prevent further heating thereof.

An insulating layer on the heater element can be configured to work in relation to the heat generated by the resistive layer to direct heat in a direction or to block heat flow emanating towards a region. The insulating layer can be positioned as a layer over or under the resistive layer.

The heating system described herein provides a low profile, e.g., flat, and highly adaptable/flexible device that can be integrated into a traffic light while providing heating at the same or similar level to an incandescent bulb for a similar application. The heating system can be adapted to fit the traffic light. This allows end users to conveniently retrofit the heater element to existing light fixtures and eliminate the cost of purchasing and replacing an entirely new light fixture.

Figure 1B:
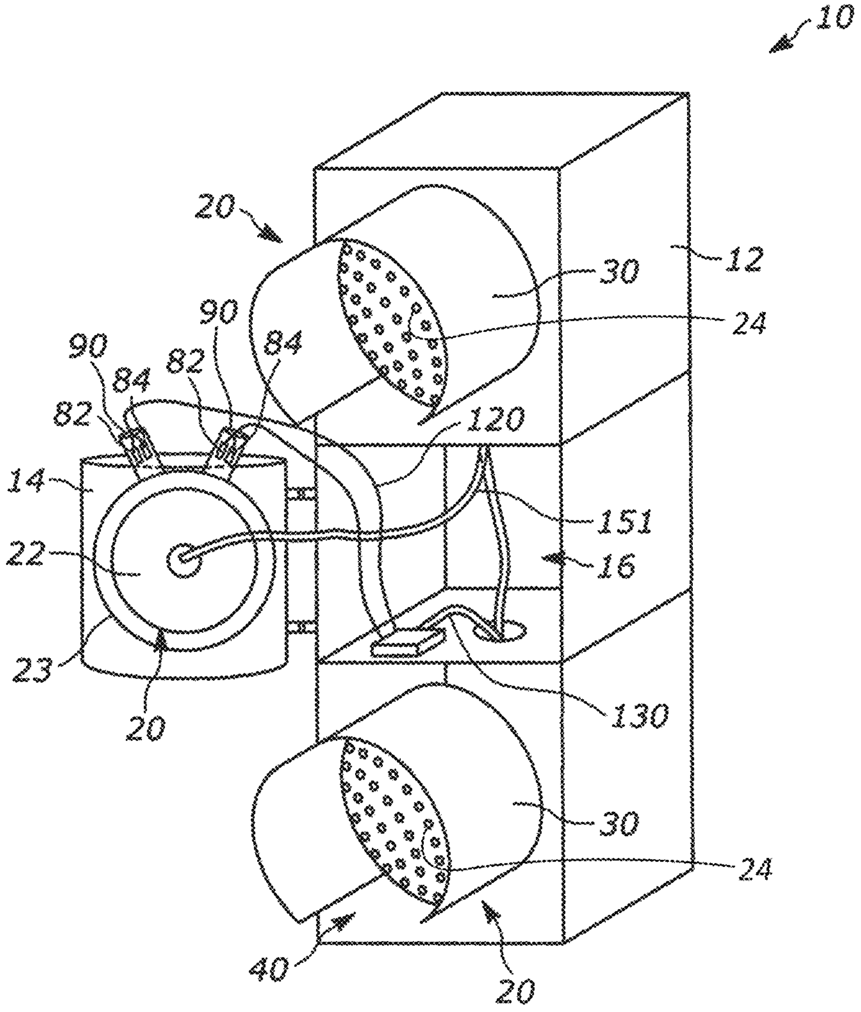
FIG. 1B is a front view of the light fixture of FIG. 1 with a door opened.

With this in mind, FIGS. 1A-1B illustrate an example traffic light 10. The traffic light 10 can be configured to control any types of traffic, including pedestrian traffic, railroad traffic, or other vehicle traffic. The traffic light 10 can be configured as a pedestrian/crosswalk light, a preemption receiver sensor, a railroad crossing light or other roadway signaling or indicating lights (not shown).

As shown in FIG. 1A, the traffic light 10 is a traffic light having three light assemblies 20 for helping to control or direct vehicle traffic. To this end, the respective light assemblies 20 can provide red/"stop" indication, yellow/"warning" indication, green/"go" indication or turn indication. Regardless, it will be appreciated that the traffic light of the present disclosure can use any number of light assemblies 20, including one, in any number of shapes and sizes.

Each light assembly 20 includes a lens 26 connected thereto that faces away from the housing 12. The lens 26 can be round, square, etc. In one non-limiting example, the light assemblies 20 can include a series of LEDs 24. The housing 12 can include one to five doors 14 (three doors shown) on which the respective light assemblies 20 are mounted.

A shroud or visor 30 is connected to and extends from each door 14. The visor 30 can be, for example, ball-cap or visor-shaped. In any case, the visor 30 includes an inner surface 34 and an outer surface 32. The inner surface 34 defines a passage 36 extending away from the door 14 along a centerline 38. The visor 30 can partially (as shown) or fully (not shown) encircle/surround the centerline 38. Consequently, the visor 30 can partially or fully encircle/surround the respective light assembly 20. As shown, a notch 40 extends radially through the bottom of the visor 30 to the passage 36. The notch 40 can allow for rain, snow, melted snow, etc. to flow out of the passage 36 and away from the lens 26. The lens 26 helps to focus light emitted by the LEDs 24 along the passage 36, thereby increasing the visibility of the light assembly 20.

A heating system 39 is provided on the visor 30 for helping to prevent/reduce the buildup of snow, ice, etc. on the lens 26. The heating system 39 includes at least one heater element 50. The heater element 50 can be formed as a composite. One or more of the heater elements 50 can be secured to the inner surface 34 of each visor 30 (as shown) and/or the outer surface 32 (not shown). Consequently, the heater element(s) 50 can cover a portion of the inner surface 34 and/or the outer surface 32 or the entirety of either/both surfaces. In any case, the heater element 50 can be flexible or rigid.

Figure 5:
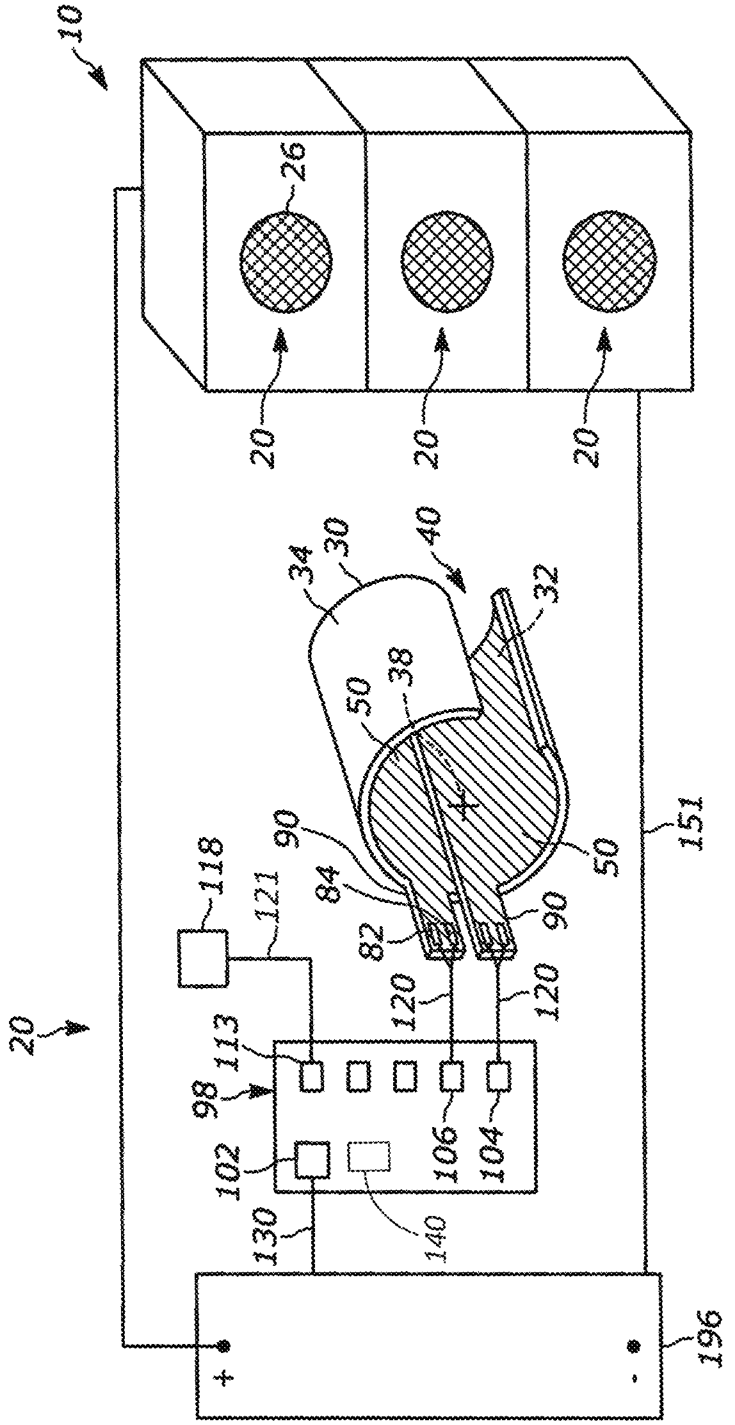
FIG. 5 is a wiring schematic for the light fixture.

Referring to FIG. 1B, the doors 14 are removably and pivotably connected to the housing 12 and selectively close an interior space 16 thereof. An enclosure 22 is connected to the lens 26. A circuit board assembly (not shown) is provided within the enclosure 22 behind the lens 26. The LEDs 24 can be mounted to the circuit board assembly so as to emit light through the lens 26. The enclosure 22 is secured to the door 14 along a sealed interface 23. In one example, the periphery of the enclosure 22 includes a gasket (not shown) for sealing the interface 23. Wiring 151 connects the light assemblies 20 to a common voltage supply device or power supply 196 (FIG. 5).

In one example, the heater element 50 is a positive temperature coefficient (PTC) heater element. Alternatively, the heater element 50 can be formed as a fixed wattage heater (not shown).

When the heater elements 50 are installed, at least one heater element tab or connector tail 90 extends through the sealed interface 23 between the light assembly 20 and the associated door 14. This positions the connector tail 90, and therefore terminals 82, 84 connected thereto, within the interior space 16. Wiring 120 connects the module 98 to the terminals 82, 84. Once the door 14 is closed, the tabs 90 and terminals 82, 84 are sealed within this housing 12 away from wind, rain, snow, dirt, etc. It will be appreciated that the doors 14 of the traffic light 10 can be removable, thereby enabling a maintenance technician to install/inspect the light assemblies 20 and associated heater elements 50 on the doors at a more desirable location, e.g., on the ground, in a vehicle, at a facility, etc.

Figure 2:
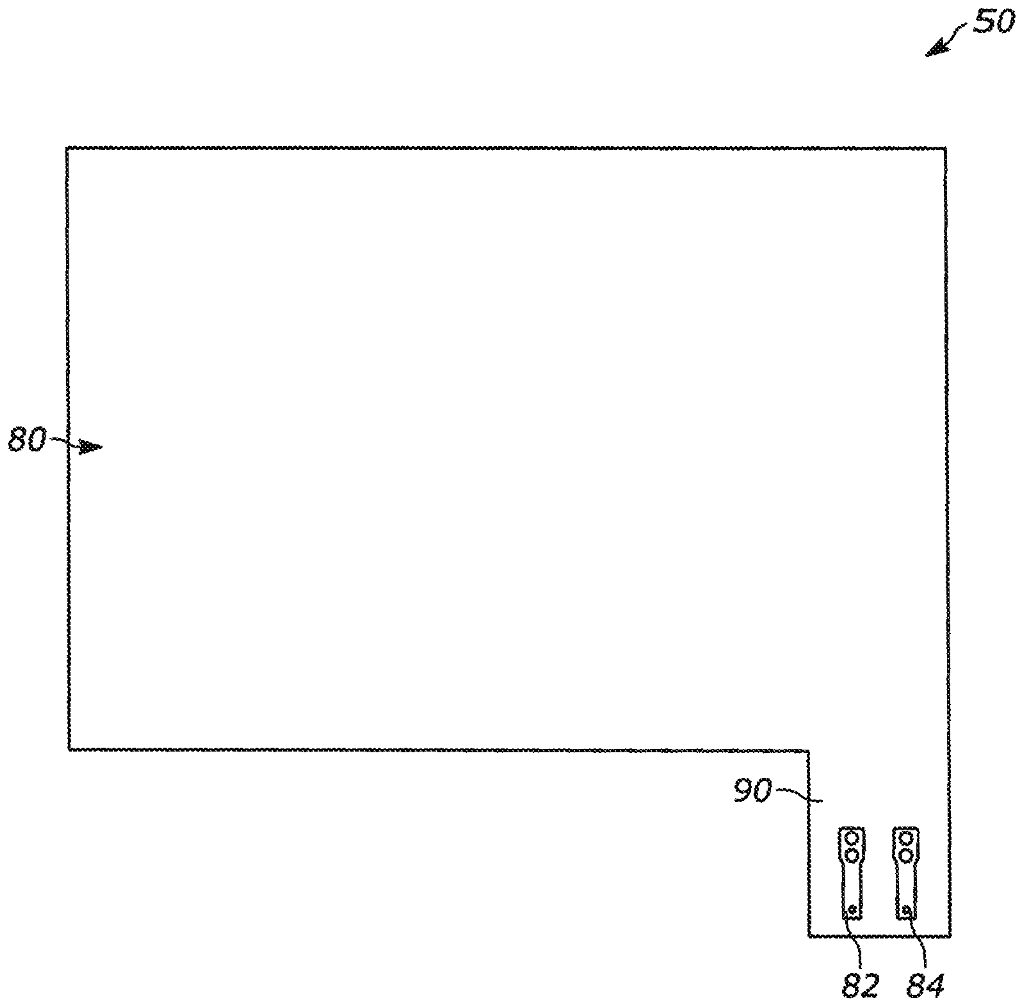
FIG. 2 is a top view of a heater element for the light fixture of FIG. 1.

FIG. 2 is an assembled heater element 50. The heater element 50 includes an interface layer 80. The interface layer 80 helps to connect the heater element 50 to the inner surface 34 of the visor 30. The connector tail 90 includes the terminals 82, 84 and extends from a main body of the heater element 50.

Figure 3:
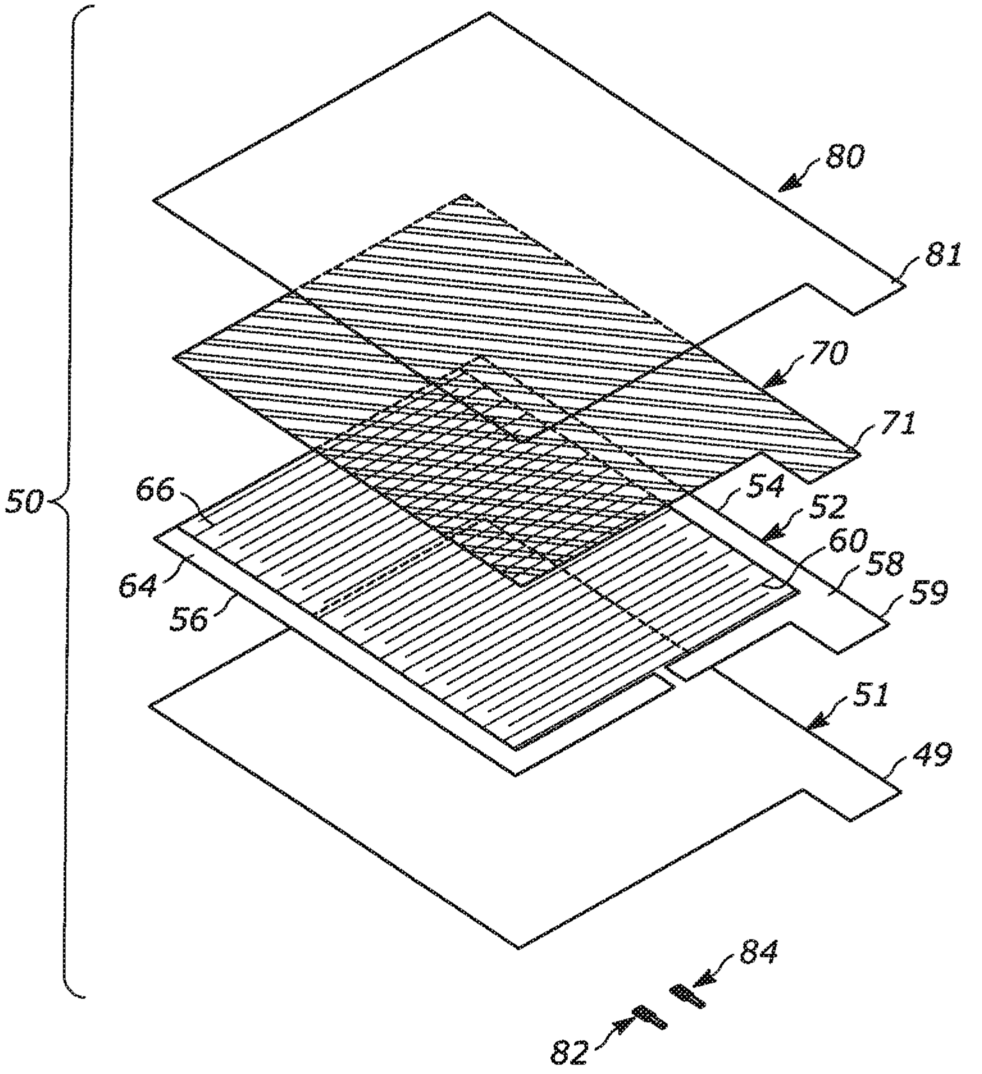
FIG. 3 is an exploded view of the heater element of FIG. 2.

FIG. 3 is an exploded view of the heater element. The heater element 50 includes a first, or carrier layer 51, made of an electrically insulating material, e.g., Mylar®, that can be impervious to water and other debris to extend the service life of the products and thus can be an exterior layer facing the environment. The carrier layer 51 includes a tab 49 and can be made the same color as the inner surface 34 of the visor 30, e.g., painted black, to prevent altering the light output of the LEDs 24. By way of clarification, the terms "first" and "carrier" refer to surfaces of the heater element 50 facing environmental elements and successive terms to first proceed inwardly toward the inner surface 34 to interface therewith.

The heater element 50 further includes a polymer base layer 52 formed from a conductive material. The polymer base layer 52 can be, for example, a screen printed, flexible polymeric ink. The polymer base layer 52 includes a first bus 54 and second bus 56 spaced from each other. The first bus 54 includes a base 58 and finger portions 60 extending away from the base. The second bus 56 includes a base 64 and finger portions 66 extending away from the base. The finger portions 60, 66 extend towards one another and can be interdigitated. That said, the finger portions 60, 66 are spaced from one another. The polymer base layer 52 includes a tab 59 aligned with and overlying the tab 49 on the carrier layer 51.

A resistive layer 70 is connected to, e.g., screen printed on, the polymer base layer 52 and can be modified or formed in desired shapes to electrically connect the first bus 54 to the second bus 56. The resistive layer 70 can be formed in one or more pieces. The resistive layer 70 includes a tab 71 aligned with and overlying the tabs 49, 59 in the carrier and polymer base layers 51, 52.

In one example, the resistive layer 70 can be positioned on top of the polymer base layer 52 to sandwich the same between the carrier layer 51 and the resistive layer 70. In any case, the resistive layer 70 can have a higher electrical resistance than the polymer base layer 52 and experience a PTC effect when heated by current.

That said, the resistive layer 70 will ultimately reach a designed steady-state temperature in which current is restricted/slowed from passing through the resistive layer and, thus, restricted/slowed from passing through the buses 54, 56. The resistive layer 70 will thereafter draw a reduced amperage required to maintain the steady state temperature, thereby self-regulating its temperature and helping to prevent overheating. The resistive layer 70 will stay "warm"—remaining in the high electrical resistance state as long as power is applied.

On the other hand, removing power will reverse the phase transformation—causing contraction of the matrix—and allow the carbon chains to re-form as the polymer matrix re-crystallizes. The electrical resistance of the resistive layer 70 (and therefore of the heater element 50) thereby returns to its original value. In other words, the resistive layer 70 is electrically conductive at room temperature but heating the resistive layer reduces its electrical conductivity until current is restricted/slowed from passing therethrough.

In one example, the interface layer 80 directly engages the inner surface 34. The interface layer 80 can be directly connected to at least one of the polymer base layer 52 and the resistive layer 70. The interface layer 80 can be, for example, a double-sided adhesive, e.g., acrylic adhesive or thermally conductive foam adhesive.

The interface layer 80 can include a peelable adhesive liner or backing including, for example, paper, vinyl or mixtures thereof (not shown). Alternatively, or additionally, mechanical fasteners (not shown) can connect the heater element 50 to the visor 30. The heater element 50 can also be provided in the visor 30 via overmolding, heat staking or by welding the heater element between the surfaces 32, 34 (not shown). Regardless, when the heater element 50 is assembled (FIG. 2), the components 51, 52, 70, 80 are oriented such that the respective tabs 49, 59, 71, 81 are aligned with one another, thereby collectively forming the connector tail 90.

The terminals 82, 84 can be a riveted or crimped first terminal 84 connected to the first bus 54 and a rivet or crimped second terminal 82 connected to the second bus 56. In one example, the terminals 82, 84 are secured to the connector tail 90 in a manner that electrically connects the terminals to the respective buses 54, 56. The terminals 82, 84 can be generally planar (as shown) or angled, e.g., 90° terminals (not shown).

Figure 4:
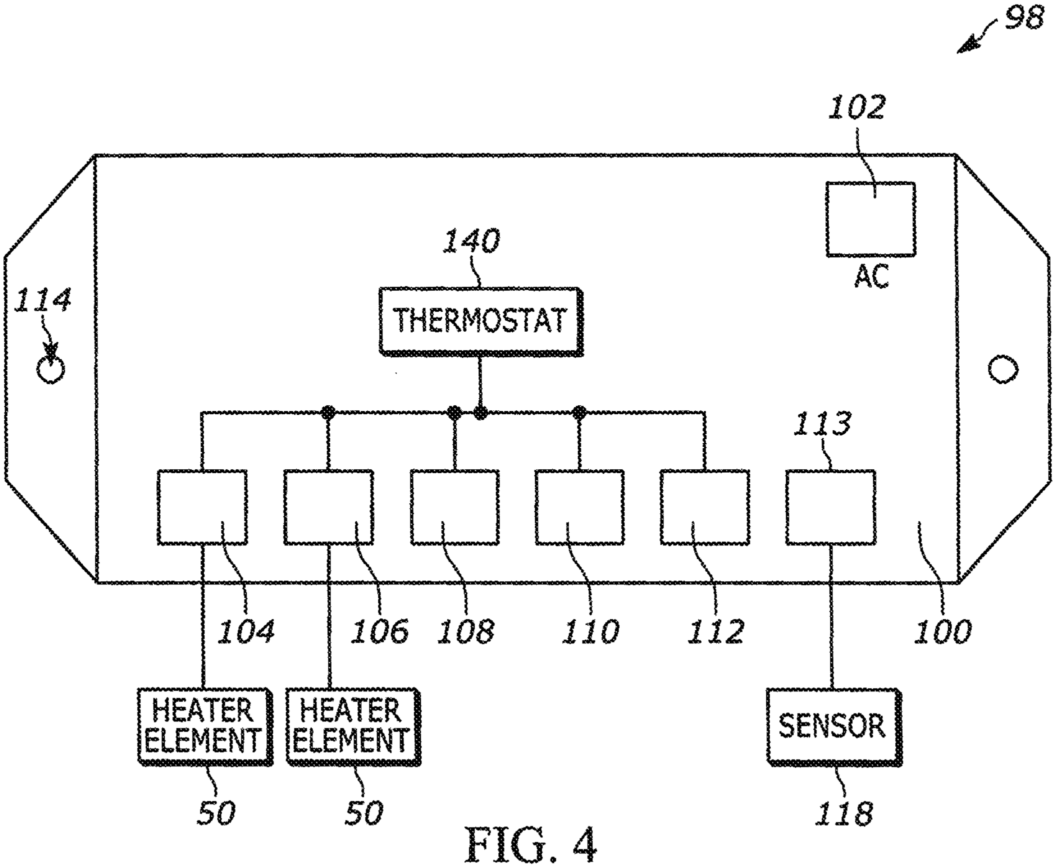
FIG. 4 is a schematic illustration of a module for the heating system.

Referring to FIG. 4, the heating system 39 further includes a control module 98 for connecting each heater element 50 to a power source and regulating the power distribution to each heater element. To this end, the module 98 includes a printed circuit board (PCB) 100 having a controller and being connected to a power source via a connector 102. The voltage input to the module 98 can be, for example, 48 VDC or 120 VAC.

A series of connectors 104, 106, 108, 110, 112 are also provided on the circuit board 100 to enable one or more of the heater elements 50 to be connected to the module 98 via the terminals 82, 84. One or more s 118, e.g., temperature sensor, humidity sensor, and/or snow sensor, can be connected to a connector 113 on the circuit board. The sensors 118 can be positioned inside or outside housing 12 and monitor the environmental conditions in/around each lens 26. The connectors 102-113 can be standard wire-to-board connectors, e.g., PID connectors, GEZ connectors, HYV connectors and the like. More or fewer of the connectors 104-113 are contemplated.

The module 98 can include a thermostat 140 associated with each connector 104, 106, 108, 110, 112 to control power flow between the module and the respective connector. Alternatively, a separate thermostat 140 can be associated with each connector 104, 106, 108, 110, 112 (not shown). Regardless, the thermostat 140 controls power flow between the module 98 and each heater element 50. In one example, the thermostat 140 enables current flow from the module 98 to the corresponding heater element 50 when the temperature around the corresponding light assembly 20 falls below a predetermined value, e.g., about 0° C. On the other hand, the thermostat 140 prevents current flow from the module 98 to each heater element 50 when the temperature is above the predetermined value.

It will be appreciated that the thermostat 140 can be omitted entirely. In this construction, the module 98 can be connected to or provided with a breaker (not shown) that either continuously enables or continuously prevents current flow to the connectors 104-112 regardless of environmental conditions. In other words, the heater elements 50 are either always on or always off depending solely on whether the user has activated the breaker.

The module 98 is secured to the traffic light housing 12 within the interior space 16 (see also FIG. 1B). To this end, fasteners can extend through mounting openings 114 in the module 98 to secure the module to existing screw holes/standoffs within the housing 12 (not shown). Alternatively, the module 98 can be secured to the housing 12 with mounting tape/foam, Velcro®, etc. Regardless, a single module 98 can be used for all the light assemblies 20 in the traffic light 10 or each light assembly can have its own module associated therewith.

FIG. 5 illustrates a schematic diagram of a circuit for the traffic light 10 in which two heater elements 50 are secured to the inner surface 32 of the visor 30 associated with one lens 26. While two heater elements are shown, it should be understood that one heater element 50 can be utilized alone.

The wiring 151 connects the light assemblies 20 to a common voltage supply device or power supply 196. Further, wiring 120 electrically connects the terminals 82, 84 from each heater element 50 to the corresponding connector 104, 106 on the module 98. Additional wiring 121 also connect any sensor(s) 118 to the module 98. Wiring 130 connects the power supply 196 to the connector 102 on the module 98 to power the module.

During operation of the traffic light 10, the thermostat 140 passively monitors the ambient outside temperature. When the temperature falls below a predetermined value on one or more of the lenses 26, the thermostat 140 automatically closes to initiate/enable current flow to the heater elements 50 associated with the cold lenses. As the temperature of the heater elements 50 rise and cause the PTC effect, the heat is transferred to the visors 30, which thereby helps to prevent, reduce or remove snow and ice accumulation on the lens 26 associated therewith. Heat from the heater element 50 can also directly heat the associated lens and snow thereon. In other words, the lenses 26 can be directly and indirectly heated by the heater elements 50 associated therewith.

The thermostat 140 can continue enabling current flow to the heater elements 50 so long as the air temperature around the visor 30 is below the predetermined value, thereby helping to ensure light from the LEDs 24 is visible through the lens 26 despite inclement weather. Any melted snow can flow along the inner surface 32 and heater element 50 and out of the visor 30 through the notch 40. Once the air temperature around the visor 30 reaches the predetermined value the thermostat 140 automatically opens to cut off power supply to the heater elements 50.

Alternatively, or additionally, the sensor(s) 118 can monitor the temperature, humidity, onset of snow and/or accumulation thereof around the lenses 26 and send signals to the module 98 indicative thereof. The module 98 controller can evaluate the signals and selectively supply current to the heater elements 50 in response thereto.

In one example, the module 98 controller is configured to initiate supplying power to the heater elements 50 when the air temperature around the visor 30 falls below about 38° F. and subsequently cut power to the heater elements when the air temperature reaches about 42° F. Alternatively or additionally, the module 98 controller can also take humidity into account, e.g., supply power to the heater elements 50 when the air temperature around the visor 30 falls below about 38° F. and the relative humidity is above 50%. The module 98 controller can also selectively power the heater elements 50 when the snow sensor 118 detects an amount of snowfall on/around the lens 26 that exceeds a predetermined amount. Other factors that can be used to determine heater element 50 activation, including when and how long, include a timer circuit and/or battery backup sensor.

The module 98 can be controlled wirelessly by a web-based application or app that allows a user to directly control individual heating of the heater elements 50 regardless of the sensed environmental conditions. In other words, the app allows a user to override or ignore any signals received by the module 98 from the sensors 118 or thermostat 140.

Figure 6:
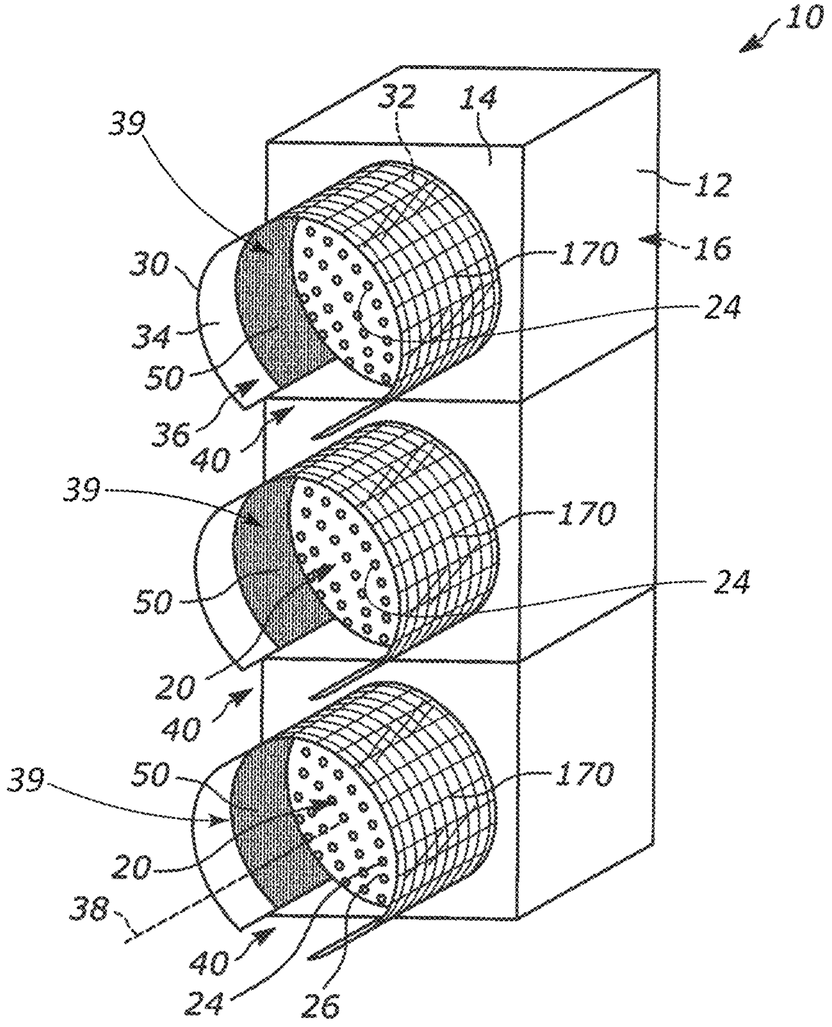
FIG. 6 is a schematic illustration of another example light fixture including solar panels.

In another example shown in FIG. 6, solar panels or cells 170 can be secured to the outer surfaces 32 of the visors 30 for powering the heating system 39, including the module 98 and components 50, 118 connected thereto. The solar panels 170 can also power the light assemblies 20. A rechargeable battery (not shown) can be electrically connected to the solar panels 170 and mounted in the interior space 16 of the housing 12 to protect the battery from the elements. The battery can replace or supplement the power supply 196. When the heater elements 50 are in use, heat therefrom radiates outward through the visor 30 and heats the solar panels 170, thereby helping to keep snow and ice from building thereon.

Figure 7:
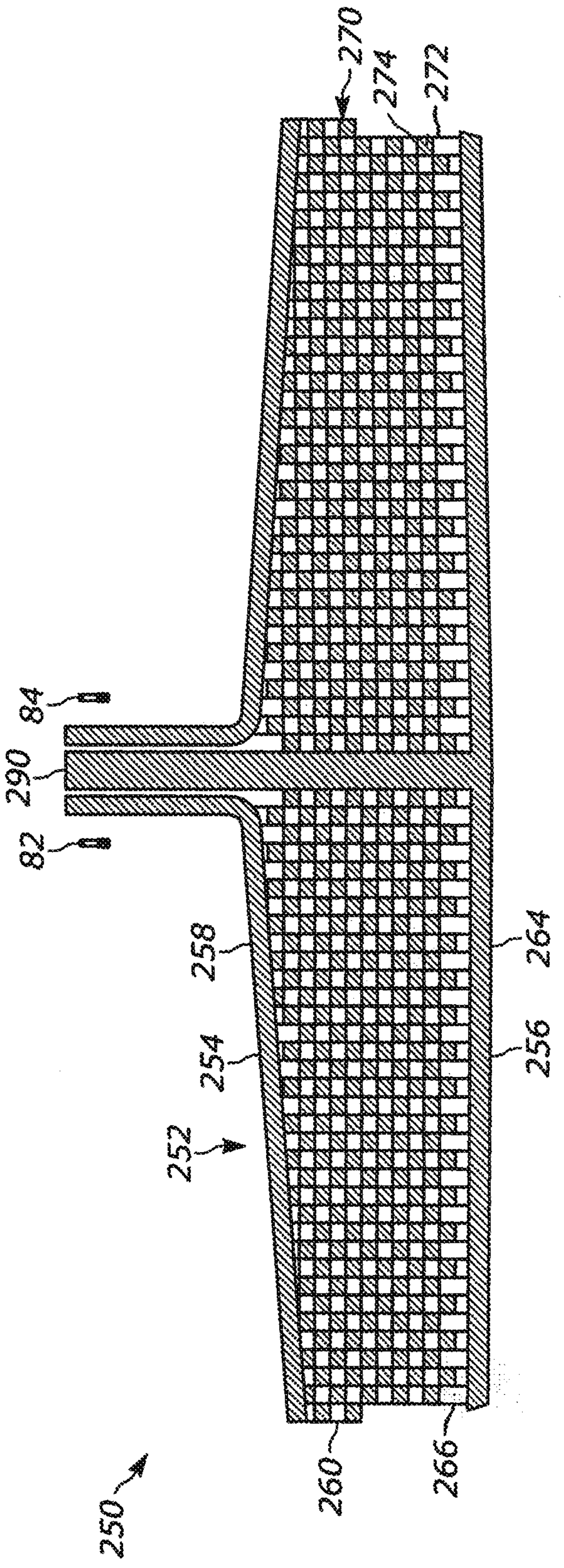
FIG. 7 is a top view of another example heater element.

Another example heater element 250 is illustrated in FIG. 7. Features in the heater element 250 that are similar to those in heater element 50 are given reference numbers 200 higher. The heater element 250 includes the carrier layer (not shown) and base layer 252 with corresponding busses 254, 256 having interdigitated fingers 260, 266. The resistive layer 270 is provided over, e.g., printed on, the base layer 252 in a manner that resembles a checkboard pattern. More specifically, the resistive layer 270 is formed as a series of conductive portions 272 spaced apart from one another by non-conductive portions, i.e., voids or empty spaces 274, arranged collectively in a checkboard pattern. In this manner, the resistive layer 270 does not cover every portion of the base layer 252, i.e., there are discontinuities in the printing pattern.

The checkerboard pattern exemplifies how the resistive layer can be provided in the heater element in any desirable configuration, e.g., symmetric, asymmetric, random, patterned, variable density, etc. This flexibility allows the resistive layer to have a desired watt density at each and every position on the heater element. Consequently, a specific heating profile can be provided depending on the application where the heating system will be used.

The heating systems shown and described herein, e.g., heater elements formed as fixed wattage heaters or phase-changing heater elements, are advantageous in helping to avoid a hazardous condition as a result of snow buildup on LED lights, such as traffic lights, pedestrian crosswalk lights, railroad crossings, and pre-emptive receiver sensors.

The PTC heater element may be installed without the need for sensors, thermostats, or other feedback electronics. The PTC heater element is efficient and runs at very low steady state current. Current draw increases as temperatures decrease or snow attempts to stick to the surface, returning to steady state after melting. The PTC heater element is configurable to many different shapes, contours, and sizes of visors. Custom shapes ensure proper assembly and flexibility.

What have been described above are examples of the present disclosure. It is, of course, not possible to describe every conceivable combination of components or methodologies for purposes of describing the present disclosure, but one of ordinary skill in the art will recognize that many further combinations and permutations of the present disclosure are possible. Accordingly, the present disclosure is intended to embrace all such alterations, modifications and variations that fall within the spirit and scope of the appended claims.

Further aspects of the disclosure are provided by the subject matter of the following clauses:

A heating system for a traffic light, the heating system comprising a heater element having multiple layers including an interface layer for connection with a portion of the traffic light and a resistive layer for regulating a current.

The heating system of any preceding clause, further comprising a control module for controlling a supply of power from a power source to the heater element.

The heating system of any preceding clause, wherein the resistive layer maintains a high electrical resistance when connected to the power source.

The heating system of any preceding clause, wherein a reduced amperage is required to maintain a steady state temperature for the resistive layer.

The heating system of any preceding clause, wherein the heater element further comprises a carrier layer and the resistive layer is located between the interface layer and the carrier layer.

The heating system of any preceding clause, wherein the carrier layer is made of an electrically insulating material.

The heating system of any preceding clause, wherein the polymer base layer is made of a conductive material.

The heating system of any preceding clause, wherein the portion of the traffic light is a visor surrounding a lens of the traffic light and the interface layer is mounted to the visor.

The heating system of any preceding clause, wherein at least a portion of the heater element is screen printed directly onto the visor.

The heating system of any preceding clause, wherein the heater element is mounted to the visor with adhesive.

The heating system of any preceding clause, wherein the heater element is heat staked or overmolded to the visor.

The heating system of any preceding clause, wherein the heater element is welded between the inner surface and an outer surface of the visor.

The heating system of any preceding clause, wherein the interface layer is an adhesive layer.

The heating system of any preceding clause, wherein the heater element is a composite.

The heating system of any preceding clause, further comprising a circuit board having a series of connectors, wherein the control module is connected to the power source via at least one connector in the series of connectors and the control module is connected to the heater element via another at least one connector in the series of connectors.

The heating system of any preceding clause, further comprising at least one sensor for determining when the heater element should be energized, the at least one sensor connected to the control module via yet another at least one connector in the series of connectors.

The heating system of any preceding clause, wherein the at least one sensor is a temperature sensor.

The heating system of any preceding clause, wherein the at least one sensor is a humidity sensor.

The heating system of any preceding clause, wherein the at least one sensor is a snow sensor.

The heating system of any preceding clause, wherein the resistive layer experiences a positive temperature coefficient (PTC) effect when heated by current.

The heating system of any preceding clause, wherein the heater element is a fixed wattage heater element.

The heating system of any preceding clause, wherein the heater element includes a connector tail on which electrical terminals are mounted.

The heating system of any preceding clause, further comprising a circuit board with a series of connectors for connecting the heater element to a module via terminals.

The heating system of any preceding clause, further comprising at least one sensor connected at least one connector on the circuit board.

What is claimed is:

1. A heating system for a traffic light having at least one light assembly, the heating system including a heater element provided along a portion of the traffic light at least partially surrounding the at least one light assembly, wherein the heater element comprises:

an interface layer;

a polymer base layer formed from a conductive material;

a resistive layer formed of a material having an electrical resistance which generates heat in variance with a supply of power provided to the heater element, wherein at least one side of the resistive layer is in contact with the polymer base layer; and a carrier layer formed of a material impervious to water, wherein the carrier layer covers at least one of the polymer base layer and the resistive layer; and wherein the polymer base layer and the resistive layer are located between the interface layer and the carrier layer, and a tab extends from each of the carrier layer, the interface layer, the polymer base layer, and the resistive layer.

2. The heating system of claim 1, wherein the interface layer is disposed between the portion of the traffic light and at least one of the polymer base layer and the resistive layer.

3. The heating system of claim 2, wherein the interface layer comprises an adhesive engaging the portion of the traffic light.

4. The heating system of claim 1, wherein the tab from each of the carrier layer, the interface layer, the polymer base layer, and the resistive layer are oriented to align with one another.

5. The heating system of claim 1, further comprising a power source connected to the heater element and a control module connected to the power source which controls the supply of power from the power source to the heater element.

6. The heating system of claim 5, wherein the resistive layer maintains the heater element at a steady state temperature when the supply of power is provided to the heater element.

7. The heating system of claim 5, wherein, when the supply of power is provided to the heater element, the electrical resistance of the resistive layer increases to define a high electrical resistance state.

8. The heating system of claim 5, further comprising at least one sensor connected to the control module, where the control module receives signals from the at least one sensor, and the supply of power can be provided to or cut off from the heater element according to signals from sensor.

9. The heating system of claim 1, wherein the polymer base layer includes at least a first bus and a second bus spaced apart from the first bus, wherein the first bus and the second bus are electrically connected by the resistive layer.

10. The heating system of claim 9, wherein the first bus and the second bus each includes finger portions, and the finger portions of the first bus are spaced apart from and interdigitated with the finger portions of the second bus.

11. The heating system of claim 10, wherein the first bus and the second bus are electrically connected by the resistive layer at the finger portions.

12. The heating system of claim 9, further comprising a power source connected to the heater element and a control module connected to the power source which controls the supply of power from the power source to the heater element.

13. The heating system of claim 9, wherein, when the supply of power is provided to the heater element, the material of the resistive layer restricts current passing through the first bus and the second bus to maintain the heater element at a steady state temperature.

14. The heating system of claim 1, wherein the carrier layer is made of an electrically insulating material.

15. The heating system of claim 1, wherein the heater element is a fixed wattage heater element.

16. The heating system of claim 1, wherein the heater element is a composite.

17. The heating system of claim 1, wherein the portion of the traffic light is a visor.

18. The heating system of claim 17, wherein at least a portion of the heater element is screen printed directly onto the visor.

19. A heating system for a traffic light having at least one light assembly, the heating system including a heater element provided along a portion of the traffic light at least partially surrounding the at least one light assembly, wherein the heater element comprises:

a polymer base layer formed from a conductive material;

a resistive layer formed of a material having an electrical resistance which generates heat in variance with a supply of power provided to the heater element, wherein at least one side of the resistive layer is in contact with the polymer base layer; and a carrier layer formed of a material impervious to water, wherein the carrier layer covers at least one of the polymer base layer and the resistive layer; and wherein the polymer base layer includes at least a first bus and a second bus spaced apart from the first bus, wherein the first bus and the second bus are electrically connected by the resistive layer; and the first bus and the second bus each includes finger portions, and the finger portions of the first bus are spaced apart from and interdigitated with the finger portions of the second bus.

20. The heating system of claim 19, wherein the heater element has an interface layer disposed between the portion of the traffic light and at least one of the polymer base layer and the resistive layer.

21. The heating system of claim 20, wherein the polymer base layer and the resistive layer are located between the interface layer and the carrier layer.

22. The heating system of claim 20, wherein the interface layer comprises an adhesive engaging the portion of the traffic light.

23. The heating system of claim 21, wherein a tab extends from each of the carrier layer, the interface layer, the polymer base layer, and the resistive layer.

24. The heating system of claim 23, wherein the tab from each of the carrier layer, the interface layer, the polymer base layer, and the resistive layer are oriented to align with one another.

25. The heating system of claim 19, further comprising a power source connected to the heater element and a control module connected to the power source which controls the supply of power from the power source to the heater element.

26. The heating system of claim 25, wherein the resistive layer maintains the heater element at a steady state temperature when the supply of power is provided to the heater element.

27. The heating system of claim 25, wherein, when the supply of power is provided to the heater element, the electrical resistance of the resistive layer increases to define a high electrical resistance state.

28. The heating system of claim 25, further comprising at least one sensor connected to the control module, where the control module receives signals from the at least one sensor, and the supply of power can be provided to or cut off from the heater element according to signals from sensor.

29. The heating system of claim 19, wherein the first bus and the second bus are electrically connected by the resistive layer at the finger portions.

30. The heating system of claim 29, further comprising a power source connected to the heater element and a control module connected to the power source which controls the supply of power from the power source to the heater element.

31. The heating system of claim 19, wherein, when the supply of power is provided to the heater element, the material of the resistive layer restricts current passing through the first bus and the second bus to maintain the heater element at a steady state temperature.

32. The heating system of claim 19, wherein the carrier layer is made of an electrically insulating material.

33. The heating system of claim 19, wherein the heater element is a fixed wattage heater element.

34. The heating system of claim 19, wherein the heater element is a composite.

35. The heating system of claim 19, wherein the portion of the traffic light is a visor.

36. The heating system of claim 35, wherein at least a portion of the heater element is screen printed directly onto the visor.

* * * * *